G. B. EDDY.
AUTOMATIC VENT VALVE FOR HEATING SYSTEMS.
APPLICATION FILED FEB. 3, 1913.
1,190,877.
Patented July 11, 1916.
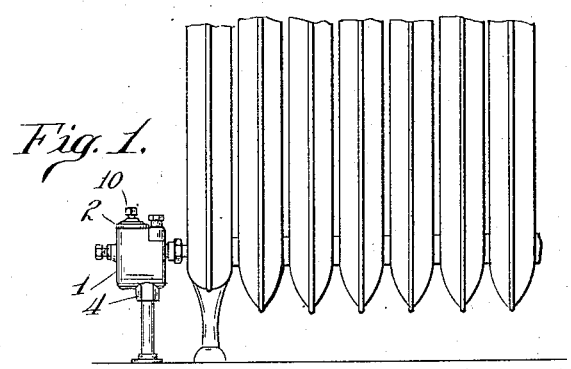
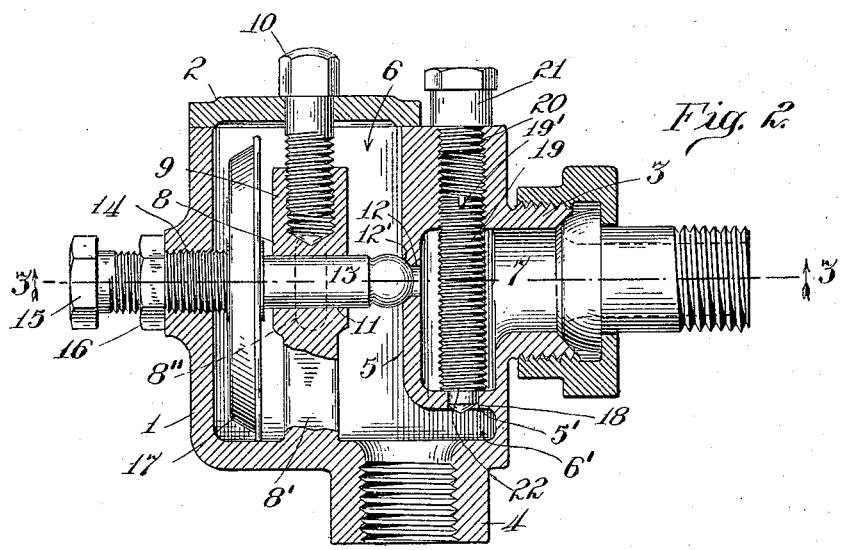
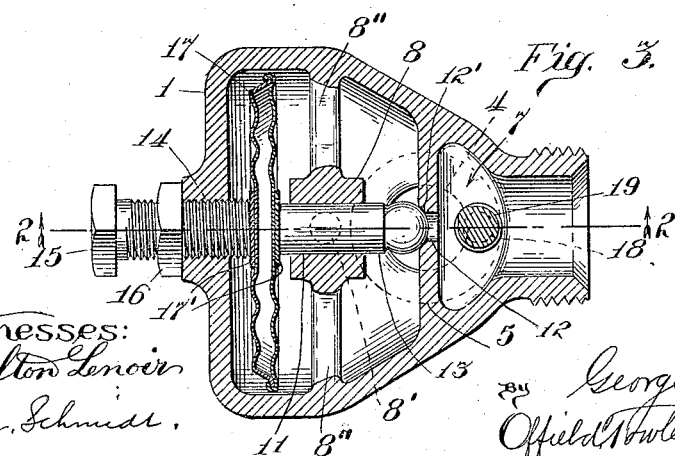

UNITED STATES PATENT OFFICE.

GEORGE B. EDDY, OF CHICAGO, ILLINOIS.

AUTOMATIC VENT-VALVE FOR HEATING SYSTEMS.

1,190,877.  Specification of Letters Patent.  Patented July 11, 1916.

Application filed February 3, 1913. Serial No. 745,792.

*To all whom it may concern:*

Be it known that I, GEORGE B. EDDY, a citizen of the United States, residing at Chicago, in the county of Cook and State of Illinois, have invented certain new and useful Improvements in Automatic Vent-Valves for Heating Systems, of which the following is a specification.

This invention relates to improvements in automatic vent valves for heating systems, etc., and it has for its salient objects to provide a construction in which the thermostatic element is a separate and independently formed removable element which may preferably accommodate itself to variations due to mechanical inaccuracies, and which, because of its independent construction, is much less susceptible to injury or malformation during the fitting and adjusting and dis-assembling of the associated parts of the valve; to provide a construction in which the thermostatic element automatically recedes by gravity or equivalent means from contact with the valve member which it controls, thus causing the retracting action of said valve member to depend upon pressure rather than making the thermostatic element (which is necessarily quite frail) do this work; to provide a construction in which the inlet opening controlled by the thermostatic valve is formed through a partition within the valve casing, a sediment chamber being formed between the main inlet passage and this valve-controlled passage, so that the lodging of sediment upon the valve seat is guarded against; to provide a normally closed outlet leading from the bottom of the sediment chamber into the main outlet of the valve, whereby the sediment chamber may be cleaned from time to time; to so organize the device as a whole that the normal thermostatic controlled valve-passage may be closed down and the passage for cleansing the sediment chamber utilized as a restricted or freely open by-pass at certain times; to provide a construction which is capable of more accurate and perfect adjustment as to the relations of a thermostatic element to the parts acted upon than has heretofore been devised; and in general, to provide a simple, efficient, cheaply constructed and reliable device of the general character referred to.

To the above ends the invention consists in the matters hereinafter described, and more particularly pointed out in the appended claims.

Referring to the drawings—Figure 1 is a view of a fragmentary portion of an ordinary radiator with my improved valve properly applied; Fig. 2 is a central vertical sectional view, taken in the plane of the line 2—2 of Fig. 3 of the valve; Fig. 3 is a horizontal sectional view taken in the plane of the line 3—3 of Fig. 2 and looking downwardly.

Referring to the drawings, 1 designates as a whole the main valve casing, which may be a hollow, cup-like body provided with a removable cap 2 and desirably provided with an externally threaded inlet nipple 3 and internally threaded outlet nipple 4. The interior of the valve casing is separated by a vertical transverse partition 5, the lower end portion of which is deflected into horizontal position, as indicated at 5', and extended to the face wall, thereby separating the interior of the valve into a main chamber 6 and combined inlet and sediment chamber 7; the main chamber 6 having an extension 6' which extends directly beneath a portion of the sediment chamber. A supporting spider 8 is cast integrally to occupy the central vertical portion of the main chamber; said spider preferably having one upstanding central arm 8' and two horizontal lateral arms 8", and also an upwardly projecting bored and threaded stud 9. The cover 2 is held in place by a top screw 10 extending through the cover and engaging the stud 9.

Through the hub of the spider 8 is bored a horizontal bearing aperture 11, and in axial alinement with said aperture is formed through the partition 5 a valve port 12 having upon its side toward said spider a bevel seat 12'. A valve plug 13 is fitted to slide freely but accurately through the aperture in the spider; the end of this plug being spherical and adapted to co-act with the port 12 to close the latter.

Through the back side of the valve casing is formed a threaded aperture 14 in alinement with the valve plug 13, and in which is fitted an adjustable set screw 15. On the set screw is fitted a lock-nut 16 by which the screw may be locked reliably against movement after adjustment, and its inner end is squared off to form a supporting surface, between which and the corresponding opposed end surface of the valve plug 13 is interposed an expansible thermostatic element 17.

The thermostatic element 17 is a hollow disk-like body formed of thin metal, preferably concentrically corrugated so as to afford marked freedom of movement of the sides toward and from each other in expanding and contracting; the centers of the two disks forming the sides of this element being desirably reinforced by soldered on plates 17'. The periphery of the element 17 is beveled, or it might be otherwise shaped, but in any event is so formed that when the element is resting on its lower edge it tends to tip back against the set screw 15 and away from the valve plug 13. That part of the main chamber of the valve in which this thermostatic element rests is purposely so formed as to afford free tilting movement of the element described, and bodily adjustment of the element in the direction of the axis of the valve plug. The width of the chamber is, however, such as to confine the element into approximately central position in the valve chamber, as seen clearly in Fig. 3. The element 17 is, of course, filled with a fluid which expands and contracts with the variations in the temperature in a well understood manner.

A flushing out port 18 is formed in the bottom of the sediment chamber 7 to form communication between the latter and the extension 6' of the main valve chamber, and said port is controlled by a screw plug 19 which is inserted through a suitably internally threaded aperture 20 leading down through the top side of the valve. This side of the valve casing is at this point very thick and the screw plug 19 is short enough so that when seated in its port its upper end will terminate some distance below the upper end of the threaded opening 20. The extreme upper end portion of this aperture 20 is occupied by a screw plug 21, and in order that the screw plug 19 may be manipulated it is provided with a screw slot 19', as shown. A shoulder 22 on the lower end of the plug serves as a stop to positively limit the screwing in movement of the plug.

The connections with the nipples 3 and 4 are of usual construction, and need not be specifically described.

In operation, this valve is susceptible of use in several improved ways. When the set screw 15 has been adjusted into proper relation to the expansible element 17 the valve operates as an ordinary automatic thermostatically closing valve. That is to say, when the interior of the valve is cold the valve plug 13 is free to move back and thus permit air, water or steam to pass through the port 12 from the radiator to the discharge pipe, and when the temperature rises sufficiently by the inflow of steam or hot water the thermostatic element forces the valve to its seat and automatically shuts off such flow.

In the operation of the valve the screw plug 19 which controls the by-pass port stands directly opposite the port 12 and acts as a deflector which effectively baffles the flow of sediment into the port 12. When the valve has been in use for some time and a quantity of sediment has collected in the bottom of the sediment chamber it may be flushed out and in fact positively forced out by simply taking out the screw 21 and then backing out the screw-plug 19 far enough to open the port controlled thereby, but without opening the valve casing to the exterior. The steam and water will then find a direct passage through the by-pass to the outlet and so cleanse out the sediment. When the system has been newly installed, and the pipes maintained more or less dirt and sediment, the thermostatic element may be removed and the set screw turned in to engage the valve plug and positively hold closed the port 12. The by-pass plug 19 may then be raised and adjusted so as to afford a restricted passage through the by-pass port, which passage will sufficiently regulate the flow of the heating fluid for temporary purposes and will at the same time permit the sediment to pass on through the pipes, so that the system may be cleaned up before it is adjusted for automatic regulation. In the same manner any one of these valves may be then converted into a non-automatic but adjustably-controlled outlet valve temporarily while the thermostatic element is taken out for exchange or repair.

While I have herein shown and described a preferred embodiment of the invention, yet it will be obvious that the details of construction and arrangement may be somewhat modified without departing from the spirit of the invention. I do not, therefore, intend the claims to be limited to exact details except in so far as they are made specific in terms.

I claim as my invention:

1. In a valve of the character described, the combination with the outer valve-casing, of an internal partition including an upright portion, dividing the interior into two chambers, one constituting a combined inlet and sediment chamber and the other a main chamber in communication with the outlet, said partition being provided with a valve port in its upright portion, a thermostatic element and valve mechanism controlled thereby arranged wholly within said main chamber and operating to control said valve port, and a baffle in said inlet chamber extending opposite the valve port in said partition.

2. In combination, a valve casing having its interior divided by a partition into side by side inlet and main chambers, the lower end of said partition being deflected laterally to meet the side wall of the casing at a point above the bottom of the main chamber, whereby a portion of the inlet chamber is superposed above a portion of the main chamber, said partition being provided in its upright portion with a valve port and in its deflected lower portion with another port, a valve support extending into said main chamber, a valve plug slidably mounted in said support and arranged to coöperate with the port in the upright part of said partition, an adjustable stop screw threaded through the side wall of the casing opposite the end of the valve plug, said stop screw being capable of adjustment to directly engage the valve plug and hold it against its seat, and retractable to provide a substantial space between the end of the stop screw and end of the valve plug, an expansible thermostatic element loosely interposed between the stop screw and valve plug, and a screw plug threaded to extend through the upper portion of the valve casing, its lower end entering and closing said port in the deflected part of said partition, whereby said screw plug may be retracted to open the port controlled thereby without opening the valve casing to the exterior.

3. In a valve, the combination of an internal partition provided with a port therethrough, of a screw plug threaded through the exterior wall of said valve casing and controlling said port, the part of said valve casing through which the plug extends being relatively thick, the screw plug being of such length that when seated against the port its head end will terminate a substantial distance inside the outer surface of the valve casing, and a separate closure closing the outer end of the bore in which said screw plug is seated.

4. In a valve of the character described, the combination with the outer valve casing, of an internal partition dividing the interior into two chambers side by side, one of said chambers constituting a combined inlet and sediment chamber and the other a main chamber communicating with the outlet, said partition being provided with a valve port in its upright portion and a by-pass port through the lower side of the sediment chamber, an automatic valve mechanism arranged in the main chamber to control the upper valve port, and a plug extending through the inlet and sediment chamber and normally closing the by-pass, said plug being arranged directly opposite but spaced away from the valve port and in the direct line of flow of the fluid on its way through the inlet chamber to said port, whereby said plug acts as a deflector to prevent sediment passing into said valve port.

5. In a valve of the character described, the combination with the outer valve-casing, of an internal partition having an upright portion and dividing the interior of the casing into two chambers side by side, one constituting an inlet chamber and the other a main chamber in communication with the outlet, a valve-support extending into the main chamber and provided with a horizontal valve-supporting aperture therein, a valve wholly within said main chamber mounted in said valve-support and unrestrained from sliding freely therein, a port extending through said partition and located in axial alinement with said valve and controlled by the latter, a thermostatic element interposed between the other end of the valve and the opposed side wall of the chamber, and an adjustable stop mounted in said latter side wall of the chamber and adapted to coöperate with the proximate side of said thermostatic element.

6. In a valve of the character described, the combination with the valve casing, of a valve member mounted to slide unrestrainedly on a horizontal support, and a valve port controlled thereby, of a thermostatic element within the valve chamber adapted to move said valve member to its seat, said element resting upon and having pivotal and unstable engagement with the floor or lower wall of the casing and arranged to tend to tilt by gravity and an adjustable stop associated with said thermostatic element.

7. In a valve of the character described, the combination with a valve casing, of a valve plug horizontally and slidably mounted therein and provided at its front end with a valve member controlling an inlet port, an adjustable stop member, and a thermostatic element loosely interposed between the rear end of the valve plug and the adjacent end of the stop, said thermostatic element being wholly free to move away from both the valve plug and stop and weighted to normally tilt by gravity away from the valve plug.

GEORGE B. EDDY.

Witnesses:
ALBERT H. GRAVES,
EMILIE ROSE.